Dec. 9, 1947.  A. J. WALT  2,432,184
ACCORDION SHIFT MECHANISM
Filed Feb. 28, 1946  2 Sheets-Sheet 1
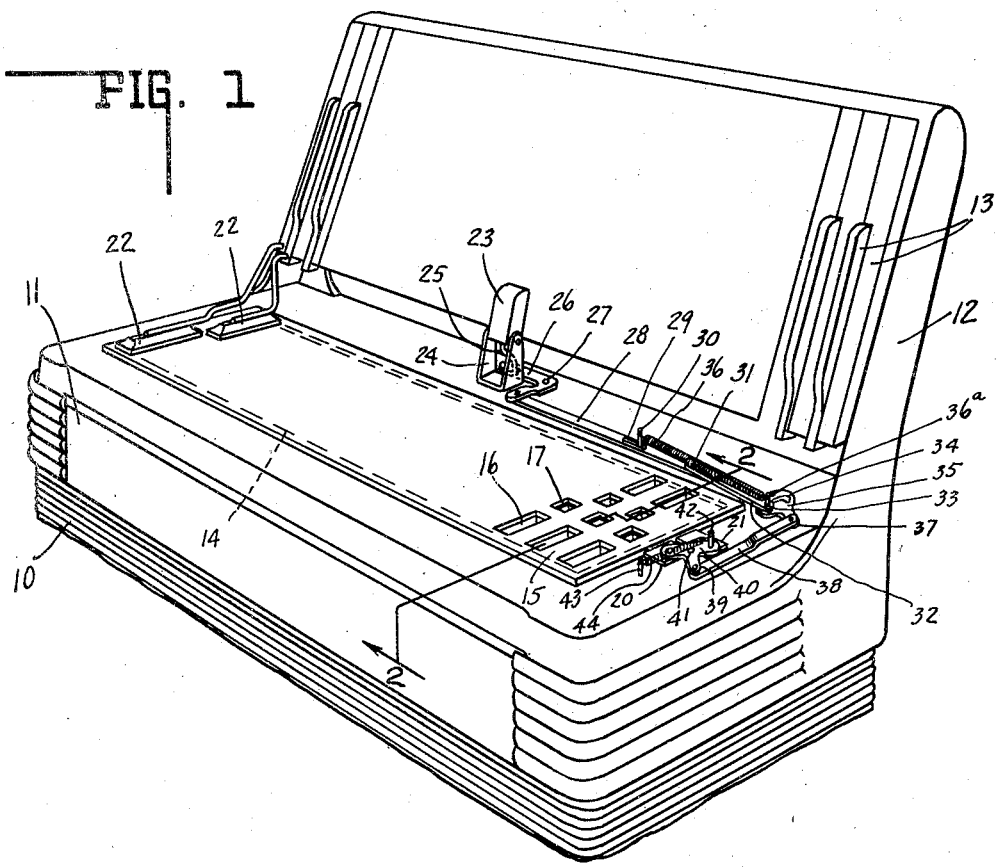
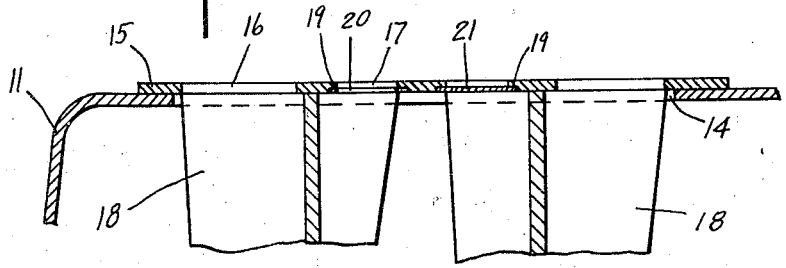
INVENTOR.
ALBERT J. WALT.
BY
Lockwood, Goldsmith & Galt
ATTORNEYS.

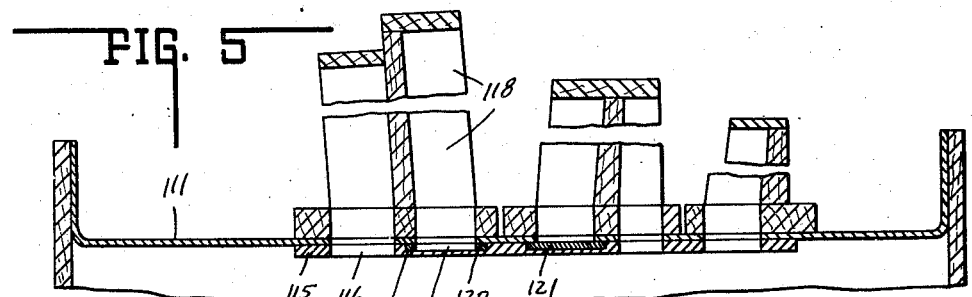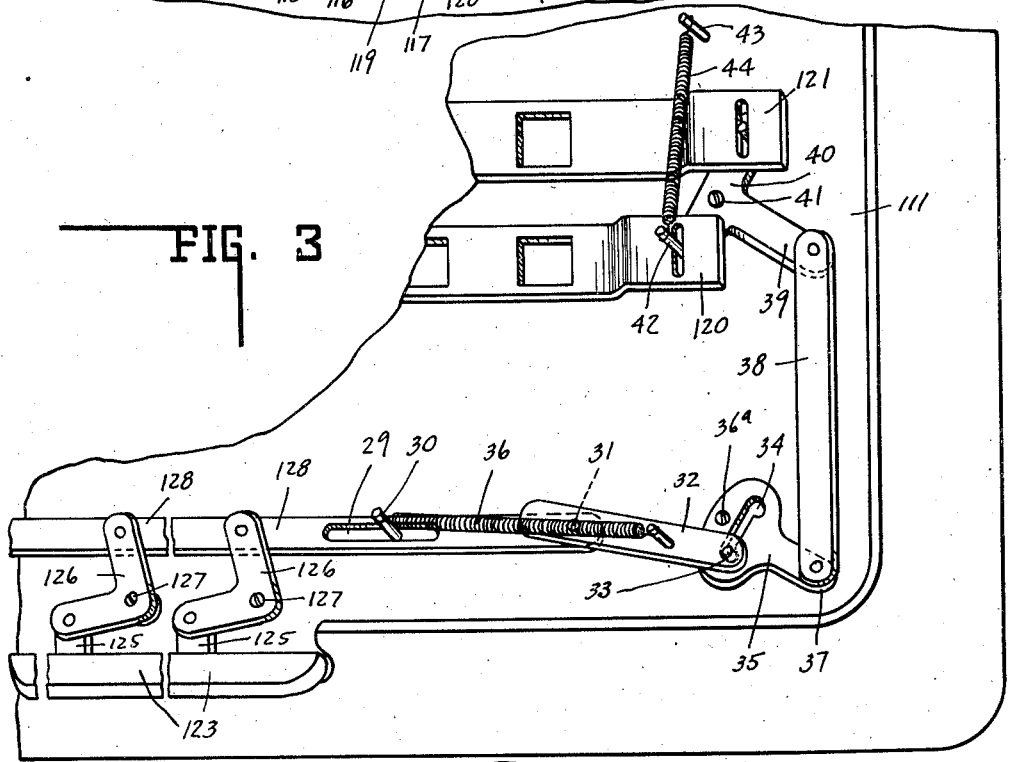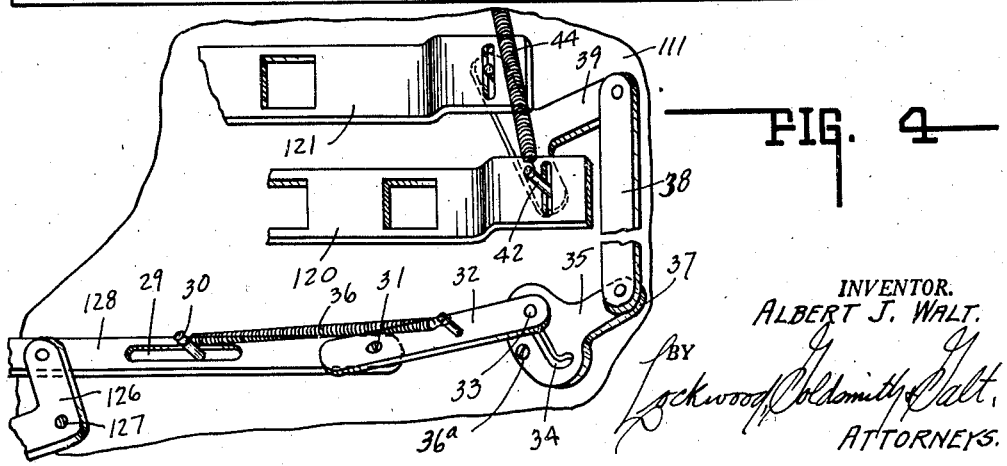

Patented Dec. 9, 1947

2,432,184

UNITED STATES PATENT OFFICE 2,432,184

ACCORDION SHIFT MECHANISM

Albert J. Walt, De Kalb, Ill., assignor to The Rudolph Wurlitzer Company, Chicago, Ill., a corporation Application February 28, 1946, Serial No. 650,821

8 Claims. (Cl. 84—376)

1

This invention relates to a shift mechanism and the supporting valve plate therefor operable by a conveniently located shift key or bar to shift the slide valves controlling the treble or bass reed blocks respectively.

The invention is particularly directed to the positive and simplified actuating mechanism operable each time the shift key or bar is depressed to effect a shifting of the slide valves through a spring-controlled linkage mounted upon the valve plate, as hereinafter more particularly set forth and described.

Another feature of the invention resides in the mounting and location of the shift key for the treble slide valves in a manner to pivotally support it to extend over the keyboard so as to be operable by the same finger movement as the keys thereon.

Another feature of the invention resides in the valve plate wherein it is secured to the treble or bass box and directly supports the shift mechanism on one side thereof and the reed blocks on the other side, said valve plate being recessed to slidably embrace and maintain the slide valves relative to their proper reed block apertures.

The full nature of the invention will be understood from the accompanying drawings and the following description and claims:

Fig. 1 is a perspective view of that portion of the accordion illustrative of the treble box, slide valves and shift mechanism therefor in association with the accordion keyboard.

Fig. 2 is an enlarged sectional view taken on the line 2—2 of Fig. 1.

Fig. 3 is a partial plan view showing the shift mechanism applied to the bass box of the accordion with the shift in one position thereof.

Fig. 4 is the same as Fig. 3 showing the shift mechanism in reversed position.

Fig. 5 is the same as Fig. 2 showing the valve plate of the bass box with parts broken away.

In the drawings there is shown that portion of an accordion including a bellows 10, which are broken away, a treble box 11, keyboard 12 and playing keys 13.

The treble box 11 is formed with an open top indicated at 14 in Fig. 2 closed by a valve plate 15 mounted and secured thereover. Said valve plate is provided with a series of apertures 16 and 17, to the underside of which are secured the reed blocks 18, whereby said reed blocks are carried and supported by the plate 15 within the treble box 11. Said plate 15 is recessed at 19 to receive the treble slide valves 20 and 21. In the usual manner said slide valves are provided with

2 apertures adapted to move into and out of registry with their respective apertures 17 provided in the valve plate. Each of the keys 13 carries a valve 22 seatable over the apertures 16 and 17 of said valve plate for opening and closing them in the playing of the accordion in the customary manner.

For shifting the slide valves 20, 21 there is provided a shift key 23 pivotally supported upon a bracket 24. Said bracket is secured to the upper surface of the treble box intermediate its ends to extend outwardly over the keyboard 12 for supporting said shift key midway of and directly over the keys 13. Connected with the shift key there is a shift key finger 25 interconnected with a bell crank lever 26 fulcrumed at 27 upon the treble box. The opposite end of said bell crank lever is pivotally connected to a link 28 extending toward one end of the treble box adjacent the keyboard. Intermediate the ends of said link there is provided an elongated slot 29 slidably associated with a pin 30 secured to and upstanding from the top of the treble box. The far end of said link is pivotally connected at 31 to a shift finger 32. The free end of said shift finger is provided with an upstanding pin 33 which slidably engages in an arcuate slot 34 in an oscillator 35. Said oscillator is pivoted at 36a to the top of the treble box so as to oscillate thereabout upon actuation of the finger 32. A tension spring 36 connects the sliding pin 33 with the fixed pin 30. Said spring thereby tends to return said finger, link 28 and shift key 23, to normal position following each operation.

The oscillator 35 is formed with an extension 37 to which the link 38 is pivoted at one end so as to reciprocate said link upon the oscillation thereof. The opposite end of said link is pivotally connected to a corresponding extension 39 of the T-crank 40 centrally secured at 41 to the top of the treble box. One end of the T-crank is pivotally connected to the slide 20 and the other end to the slide 21, the latter pivotal connection including an upstanding pin 42 connected to a pin 43 extending upwardly from the top of the treble box by a tension spring 44.

From the foregoing, it will be observed that by reason of the tension of said spring 44, the T-crank will be yieldingly held in one or the other of its extreme positions with said slide valves positioned in or out of registry with their respective apertures 17. This results by reason of the said spring 44 being arranged to one side of the pivot 41 so as to draw the T-crank to its extreme position upon it being thrown over center by the movement of the link 38. Thus, it will not lock or remain in dead center irrespective of the positioning thereof by said link.

The shifting of the T-crank and, therefore, the shifting of the valves between their respective open and closed positions, is effected each time that the shift key is depressed. Upon the shift key being depressed it causes the bell crank lever 26 to shift link 28 endwise which in turn shifts the finger 32 against one end of the oscillator 35. This causes the oscillator to swing about its pivot 36a to reciprocate the link 38 such as to shift the T-crank 40 and valves to their reverse positions. Upon the oscillator being swung about its pivot, the spring 36 will shift the pin 33 along the arcuate slot 34 to the opposite end thereof, thereby holding the oscillator in its shifted position and returning the finger, its link 28 and the shift key 23 back to normal position. Thereupon said key may be again depressed, whereby the above described operation will similarly actuate the mechanism to reverse the oscillator and shift the T-crank and the valves operated thereby to the reverse position.

In the above manner, every time the shift key is depressed, the slide valves 20, 21 are shifted. Inasmuch as the shift key extends over the playing keys 13 in parallel alignment therewith, the player may utilize his finger movement to shift the valves in the same manner that he plays the keyboard.

That part of the invention pertaining to the linkage of the shift is shown applied to the bass box and bass shift valves in Figs. 3, 4 and 5. Therein the bass box 111 is apertured to receive the valve plate 115 provided with apertures 116 and 117 therein. Supported upon the bass box in communication with said apertures there is a series of bass reed blocks indicated at 118. The valve plate 115 is recessed at 119 to receive sliding valves 120 and 121 for controlling the apertures 117 to the reed blocks respectively.

For shifting said valves in the manner above described in respect to the treble shift, there is provided a depressible shift bar 123 pivotally connected by the arms 125 with a plurality of bell crank levers 126 spaced from each other to be connected with the shift bar adjacent each end thereof. Each of said bell crank levers is fulcrumed at 127 to the valve plate, having their free ends pivotally connected to an equalizer bar in the form of the link 128. Said equalizer bar is arranged to shift the valves through a mechanism operating as above described in respect to the treble shift, wherein like parts are indicated by like numerals, other than the pin on the shift bar 32 to which the spring 36 is connected is offset and spaced from the sliding pin 33 slidably connecting said shift bar with the oscillator 35.

In the manner above described, the bass valves are shifted each time that the shift bar 123 is depressed to simultaneously through the bell crank levers 126 slide the equalizing bar 128 forwardly against the tension of spring 36 connected with the shifter finger 32. The spring 36 not only returns the shifter mechanism and shift bar to normal position after being actuated, but retains under tension the shifter finger 32 in its over center actuated position. As said finger is thus moved forwardly by the equalizing bar, it swings the oscillator 35 about its pivotal mounting to similarly through link 38 swing the T-crank 40 to its opposite position, as shown in Fig. 4. This shifts the valves to their reverse position. Thus, the same mechanism is operable to shift the valves upon depression of the shift bar 123 in the same manner as occurs upon depressing the treble shift key 23.

The invention claimed is:

1. In an accordion having a pair of slide valves, a shift mechanism therefor comprising a T-crank pivotally connected at opposite ends thereof to said slide valves respectively, said crank having an intermediate protruding arm, a spring connecting with said crank to provide an overcenter bias therefor, a pivotally supported oscillator having a transverse slot and pivotally connected at its oscillating end to the arm of said crank, a shift finger having sliding engagement in the slot with one side of said oscillator, said finger being biased in retracted position, and a shift key operatively connected with said shift finger manually operable to move it in a direction to swing said oscillator upon each operation thereof, said shift finger sliding to the other side of said oscillator upon being retracted and guided by said slot.

2. In an accordion having a treble box and keyboard extending therefrom, said treble box having a pair of slide valves, a shift mechanism for said valves comprising a T-crank pivotally connected at opposite ends thereof to said slide valves respectively, said crank having an intermediate protruding arm, a spring connected with said crank to provide an over center bias therefor, a pivotally supported oscillator having a transverse slot and pivotally connected at its oscillating end to the arm of said crank, a shift finger having a sliding engagement in said slot with one side of said oscillator, said finger being biased in retracted position, a shift key operatively connected with said shift finger operable to move it in a direction to push said oscillator to one side upon each operation thereof, said shift finger sliding to the other side of said oscillator upon being retracted guided by said slot, and a bracket on said treble box for pivotally supporting said shift key to extend over said keyboard in substantial alignment therewith to be manually depressed thereover.

3. In an accordion having a pair of slide valves, a shift mechanism therefor comprising a T-crank pivotally connected at opposite ends to said slide valves respectively, said crank having an intermediate outwardly extending arm, a spring operably connected with said crank to provide an overcenter bias therefor, a pivotally supported oscillator having a transverse slot, a connecting link pivotally connecting the oscillating end of said oscillator with said intermediate arm, a shift finger having a sliding pin and slot engagement in said slot, a tension spring connected with said shift finger for biasing it to retracted position, and a shifter element operably connected with said shift finger manually movable to push said finger in a direction to swing said oscillator from one side to the other upon each operation thereof and upon retraction be caused to slide to the opposite end of said slot.

4. In an accordion having a pair of slide valves, a shift mechanism therefor comprising a T-crank pivotally connected at opposite ends to said slide valves respectively, said crank having an intermediate outwardly extending arm, a spring operably connected with said crank to provide an overcenter bias therefor, a piovtally supported oscillator having a transverse slot, a connecting link pivotally connecting the oscillating end of said oscillator with said intermediate arm, a shift finger having a sliding pin and slot engagement in said oscillator slot, a tension spring connected with said shift finger for biasing it to retracted position, a bracket on said accordion for pivotally supporting a downwardly depressible shift key, a bell crank lever fulcrumed adjacent said bracket operably connected with said key, and a link pivotally connecting the actuating end of said bell crank lever with the actuated end of said shift finger for causing said finger to push said oscillator from one side to the other upon each operation of said key.

5. In an accordion having a pair of slide valves, a shift mechanism therefor comprising a T-crank pivotally connected at opposite ends to said slide valves respectively, said crank having an intermediate outwardly extending arm, a spring operatively connected with said crank to provide an over-center bias therefor, a pivotally supported oscillator having a transverse slot and outwardly extending projection, a link interconnecting said projection and intermediate arm to transmit oscillatory movement between said oscillator and crank, a shift finger having a sliding pin and slot engagement in said slot, a depressible shift key supported thereon for operation to depressed position, a bell crank operably connected with said key fulcrumed intermediate its ends, a connecting link pivoted at its ends to the free end of said bell crank and the actuated end of said shift finger respectively, a fixed guide pin, said link having an elongated slot for receiving said guide pin for controlling its actuating movement, and a tension spring connecting said guide pin with the pin of said pin and slot engagement tending to retract said shift finger for returning said shift key to normal position and shifting the actuating end of said shift finger through its pin and slot engagement to the other side of said oscillator.

6. In an accordion having a treble box provided with a pair of slide valves and a key bed, a shift mechanism therefor comprising a supporting bracket extending upwardly from said treble box, a shift key pivotally mounted thereon to extend over and in alignment with said key bed adapted to be depressed towards said key bed to shift said valves, a bell crank lever fulcrumed to said box operably connected with said shift key, an oscillator pivotally mounted to said box at one end thereof adjacent said key bed, said oscillator having a transverse slot therein and a projection extending therefrom, a shift finger having a pin and slot engagement with said oscillator, a link pivotally connecting the free end of said bell crank lever with the actuated end of said shift finger, a pin and slot guide for said link, a pin anchored at one end and connected at the other end to the actuating end of said shift finger for retracting it following actuation of said key and shifting it through said arcuate slot to the other side of said oscillator, a T-crank pivotally connected at its opposite ends to said slide valves and pivotally mounted at one end of said box, a connecting link between the projection of said oscillator and the intermediate arm of said T-crank, and a spring connecting one end of said T-crank with the fixed anchor pin for biasing said crank over center upon each actuation thereof by said oscillator.

7. An accordion having a reed box, said box being provided with an opening therein, an apertured valve plate secured to said reed box for spanning said opening, a plurality of reed blocks secured to and carried by said valve plate to extend into said box, slide valves associated with the said plate, and a pair of slide valves slidably supported and guided between said valve plate and reed box movable into and out of registry with the apertures of said plate.

8. An accordion having a reed box, said box being provided with an opening therein, an apertured valve plate secured to said reed box for spanning said opening, said plate having longitudinally formed recesses therein in line with a series of valve controlled apertures respectively, a plurality of reed blocks secured to and carried by one side of said valve plate to extend into said box, each of said blocks being in communication with one of said apertures, slide valves slidably mounted in and guided by said longitudinal recesses formed in said valve plate, and a slide valve shift mechanism carried by said box operatively connected with said slide valves.

ALBERT J. WALT.